United States Patent
Jordan et al.

(10) Patent No.: US 6,678,856 B1
(45) Date of Patent: Jan. 13, 2004

(54) METHOD AND CONFIGURATION FOR ENCODING SYMBOLS FOR TRANSMISSION VIA A RADIO INTERFACE OF A RADIO COMMUNICATIONS SYSTEM

(75) Inventors: Ralph Jordan, Ichenhausen (DE); Martin Bossert, Bermaringen (DE); Gottfried Schnabl, Ulm (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/461,445

(22) Filed: Dec. 14, 1999

(30) Foreign Application Priority Data

Dec. 14, 1998 (DE) .......................... 198 57 677

(51) Int. Cl.$^7$ ............................................ H03M 13/29
(52) U.S. Cl. ....................................................... 714/755
(58) Field of Search ................................ 714/755, 757, 714/776

(56) References Cited

U.S. PATENT DOCUMENTS

| | | | | |
|---|---|---|---|---|
| 3,891,959 A | * | 6/1975 | Tsuji et al. .................. | 714/786 |
| 4,882,733 A | * | 11/1989 | Tanner ........................ | 714/752 |
| 5,052,000 A | * | 9/1991 | Wang et al. .................. | 375/233 |
| 5,214,656 A | * | 5/1993 | Chung et al. ................. | 375/261 |
| 5,218,622 A | * | 6/1993 | Fazel et al. .................. | 375/240 |
| 5,416,801 A | * | 5/1995 | Chouly et al. ................ | 370/207 |
| 5,416,804 A | * | 5/1995 | Khaled et al. ................ | 341/94 |
| 5,572,548 A | * | 11/1996 | Pirez et al. .................. | 375/260 |
| 5,812,601 A | * | 9/1998 | Schramm ..................... | 375/262 |
| 6,031,874 A | * | 2/2000 | Chennakeshu et al. ...... | 375/262 |
| 6,370,666 B1 | * | 4/2002 | Lou et al. .................... | 714/746 |

FOREIGN PATENT DOCUMENTS

| | | |
|---|---|---|
| DE | 37 22 241 C2 | 1/1989 |
| EP | 0 414 950 A1 | 3/1991 |
| EP | 0641087 A2 | 3/1995 |
| WO | WO 96/02091 | 1/1996 |
| WO | WO 98/32231 | 7/1998 |

OTHER PUBLICATIONS

Fazel, "Iterative Decoding of Generalized Concatenated Convolutional Codes", ICC '97, pp. 704–709.*

Schramm, "Multilevel Coding with Independent Decoding on Levels for Efficient Communication on Static and Interleaved Fading Channels", PIMRC '97, pp. 1196–1200.*

Ito et al., "An Adaptive Multi–Rate Speech Codec Based on MP–CELP Coding Algorithm for ETSI AMR Standard", 1998 IEEE International Conference on Acoustics, Speech, and Signal Processing, pp. 137–140.*

Stefan Höst et al.: "A First Encounter with Binary Woven Convolutional Codes", *Proceedings of the 4$^{th}$ Symposium on Comm. Theory and Appl., Lake Districts, UK*, Jul. 1997, pp. 1–17.

Near Optimum Error Correcting Coding And Decoding: Turbo–Codes (Claude Berriu), IEEE, vol. 44, No. 10, Oct. 1996, pp. 1261–1271.

"Kanalcodierung" (Martin Bossert), B.G. Teubner Stuttgart, 1998, mentioned on p. 4 of the specification.

"Transactions on Information Theory", IEEE, Mar. 1974, pp. 284–287.

* cited by examiner

*Primary Examiner*—Stephen M. Baker
(74) *Attorney, Agent, or Firm*—Laurence A. Greenberg; Werner H. Stemer; Ralph E. Locher

(57) ABSTRACT

A terminated input string with symbols is split with timing control into at least two input sequences. The input sequences are each individually encoded with an outer code to form output sequences. The output sequences are combined symbol-by-symbol into an output string with symbols. The output string is then encoded with an inner code.

17 Claims, 8 Drawing Sheets

METHOD AND CONFIGURATION FOR ENCODING SYMBOLS FOR TRANSMISSION VIA A RADIO INTERFACE OF A RADIO COMMUNICATIONS SYSTEM

BACKGROUND OF THE INVENTION

Field of the Invention

The invention lies in the telecommunications field. More specifically, the invention relates to a method and a configuration for encoding symbols for transmission via a radio interface of a radio communications system, in particular of a mobile radio system or wireless subscriber access system.

In radio communications systems, wanted information comprising a number of symbols, for example voice, video information or other data, is transmitted by means of electromagnetic waves via a radio interface between a transmitting and a receiving radio station. The electromagnetic waves are thereby transmitted using carrier frequencies within the frequency band intended for the respective system. In the GSM mobile radio system (Global System for Mobile Communications)—see, for instance, Eberspächer and Vögel "GSM Global System for Mobile Communication", B. G. Teubner, 1997—the carrier frequencies are in the range of 900 MHz, 1800 MHz and 1900 MHz. For future radio communications systems, for example the UMTS (Universal Mobile Telecommunication System) or other 3rd generation systems, the intended frequencies are in the frequency band around 2000 MHz. Frequency-division multiplexing (FDMA—frequency division multiple access), time-division multiplexing (TDMA—time division multiple access) and/or code-division multiplexing (CDMA—code division multiple access) methods as well as combinations of these known methods are used to distinguish between different signal sources at the location of the respective receiver.

In order to ensure adequate transmission quality (which is characterized, for example, by a low bit error rate), error protection encoding is added at the transmitter end to the wanted information for transmission of the wanted information via the radio interface. The error protection encoding allows reconstruction, at the receiver end, of faulty symbols that occur as a result of interference during the transmission via the radio interface. Particularly in the UMTS mobile system, which is optimized for data transmission at high data rates, for example for multimedia applications, high transmission quality must be achieved for effective utilization of the limited radio resources available. In this case, for example, a bit error rate of $10^{-6}$ is required for data transmission, while a bit error rate of $10^{-3}$ is sufficient for voice transmission.

One known method for error protection encoding, which is also called forward error correction (FEC), is, for example, convolution coding which is used, inter alia, in the GSM mobile radio system. A specific number of faulty symbols can in each case be identified and corrected at the receiver end depending on the convolution coding rate, that is to say the ratio between an original number of symbols and the number of coded symbols resulting from the addition of redundancy.

In addition to convolution coding, the symbols cain be block-coded, for example using a so-called cyclic redundancy check (CRC). A block code consisting of parity checking symbols is thereby calculated and added to the symbols. This block code makes it possible to identify that faulty symbols have occurred during the transmission via the radio interface. However, it is not always possible to correct these faulty symbols. For example, in non-realtime services, the block code can be used to control a repeated request for faulty data packets using a known automatic request (ARQ) method, while convolution coding is mainly used for realtime services, such as for voice transmission.

Alternatively, channel encoding may likewise be carried out by means of turbo encoding. That process is known, inter alia, from C. Berrou et al., "Near Optimum Error Correcting encoding and Decoding: Turbo-Codes", IEEE Transactions on Communications, Vol. 44, No. 10, Oct. 10, 1996, pages 1261–71. In turbo encoding, very long codes are produced at the transmitter end by parallel connection of two convolutional coders as well as a special turbo code interleaver. These very long codes are then decoded at the receiver end by iterative decoding of the component codes.

As an alternative to turbo encoding, chains of a plurality of component codes are also used to produce long codes to form an overall code. This is known, for example, from M. Bossert, "Kanalcodierung" [Channel encoding], $2^{nd}$ ed., B. G. Teubner Verlag, Stuttgart, 1998, page 325. The component codes are threby distinguished on the basis of inner and outer codes. Convolution coding and Reed-Solomon encoding in conjunction with interleaving are used, for example, as encoding schemes for the inner and outer codes.

The prior art error protection encoding processes (apart from turbo encoding) have a common feature in that, although the bit error rate advantageously falls exponentially with the length of the codes used, and the transmission quality rises, the decoding complexity rises exponentially with the length of the codes, however, in a disadvantageous way. On the other hand, turbo encoding has already been optimized with respect to a low level of decoding complexity, but a low bit error rate of approximately $10^{-6}$, which is required for data transmission, can be achieved only if the signal-to-noise ratio is high, that is to say in very good reception conditions, owing to the specific intrinsic types of turbo encoding.

SUMMARY OF THE INVENTION

It is accordingly an object of the invention to provide a method and a configuration for encoding symbols for transmission via a radio interface of a radio communications system, which overcomes the above-mentioned disadvantages of the heretofore-known devices and methods of this general type and which allow good error protection, corresponding to the described field of application, with a low level of decoding complexity.

With the foregoing and other objects in view there is provided, in accordance with the invention, a method of encoding symbols for transmission via a radio interface of a radio communications system, which comprises:

splitting a terminated input string with symbols with timing control into at least two input sequences;

individually encoding the input sequences with an outer code and forming output sequences;

combining the output sequences symbol-by-symbol into an output string with symbols; and encoding the output string with an inner code.

In other words, a terminated input string with symbols to be transmitted via a radio interface of a radio communications system is split, with timing control, into at least two input sequences. The input sequences are each individually coded by means of an outer code to form output sequences, and the output sequences are combined symbol-by-symbol into an output string with symbols. The output string is then coded by means of an inner code.

The functionality of the method according to the invention can be described in that the input strings are written line-by-line into a matrix where they are provided line-by-line with a respective outer encoding, are read column-by-column on the basis of the outer encoding and are combined into the output string, which is then provided with an additional inner encoding. The chaining according to the invention of the outer and inner encoding advantageously allows long codes to be used to ensure a low bit error rate, with a low level of decoding complexity at the same time.

In accordance with an added feature of the invention, the input sequences are coded using an outer code which is in each case different. The different outer codes advantageously make it possible to distinguish between the output sequences, and allow the transmission quality to be increased further.

In accordance with two additional features of the invention, convolution coding or block coding is respectively carried out as the outer or inner encoding. Alternatively, the inner encoding can also be carried out by means of modulation in accordance with a modulation scheme. When convolution coding is used for both the outer and inner encoding in conjunction with iterative decoding, it is possible to achieve bit error rate results which are less than the bit error rate of known turbo encoding.

In accordance with a further development of the invention, a number of symbols, which corresponds to the number of input sequences, in the output string is in each case coded by means of the inner code. In this way, the coded symbols in each column are provided with the inner encoding in accordance with the matrix representation.

According to further alternative developments, the symbols in the respective output sequences, the symbols in the output sequences or a number of symbols in the output string are in each case additionally interleaved. In the additional interleaving process, directly successive symbols are scrambled in such a way that they are no longer successive at the output of the interleaving device these developments advantageously allow the interference immunity to be improved, in comparison with the transmission of groups of faulty symbols, which frequently occur, via the radio interface.

In the first alternative development, the symbols in the respective output sequences can additionally be interleaved in accordance with individual interleaving algorithms.

In the second alternative development, the interleaving can in contrast be carried out symbol-by-symbol, that is to say the symbols in a respective column are interleaved, or on the basis of the output sequences or of a respective part of the output sequences, that is to say the symbols in the entire output sequences are interleaved.

In the third alternative development, a number of symbols, corresponding to the number of input sequences, in the output string can additionally be interleaved, by which means one column is in each case interleaved in accordance with the matrix representation.

With the above and other objects in view there is also provided, in accordance with the invention, a configuration for encoding symbols for transmission via a radio interface of a radio communications system, comprising:

a splitting device with timing control for splitting a terminated input string with symbols into at least two input sequences;

a plurality of outer encoding devices connected downstream of the splitting device in a direction of signal flow, the outer encoding devices individually encoding the input sequences to form output sequences with an outer code;

a combination device connected downstream of the outer encoding devices in the signal flow direction, the combination device combining the output sequences symbol-by-symbol to form a terminated output string with symbols; and an inner encoding device connected downstream of the combination device in the signal flow direction, the inner encoding device encoding the output string with an inner code.

In accordance with again an added feature of the invention, there is provided at least one interleaving device for interleaving the symbols in the respective output sequences each connected downstream of a respective one of the outer encoding devices.

In accordance with again another feature of the invention, at least one interleaving device for interleaving the symbols in the output sequences is connected downstream of the outer encoding devices.

In accordance with again a further feature of the invention, at least one interleaving device for respectively interleaving a number of symbols in the output string is connected downstream of the combination device.

The above-summarized configuration is utilized, in accordance with a concomitant feature of the invention, in a transmitting device of a mobile station and/or a base station of a mobile station of a mobile radio system.

Other features which are considered as characteristic for the invention are set forth in the appended claims.

Although the invention is illustrated and described herein as embodied in a method and configuration for encoding symbols for transmission via a radio interface of a radio communications system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

SUMMARY OF THE INVENTION

DESCRIPTION OF THE PREFERRED EMBODIMENTS

Figure 1:
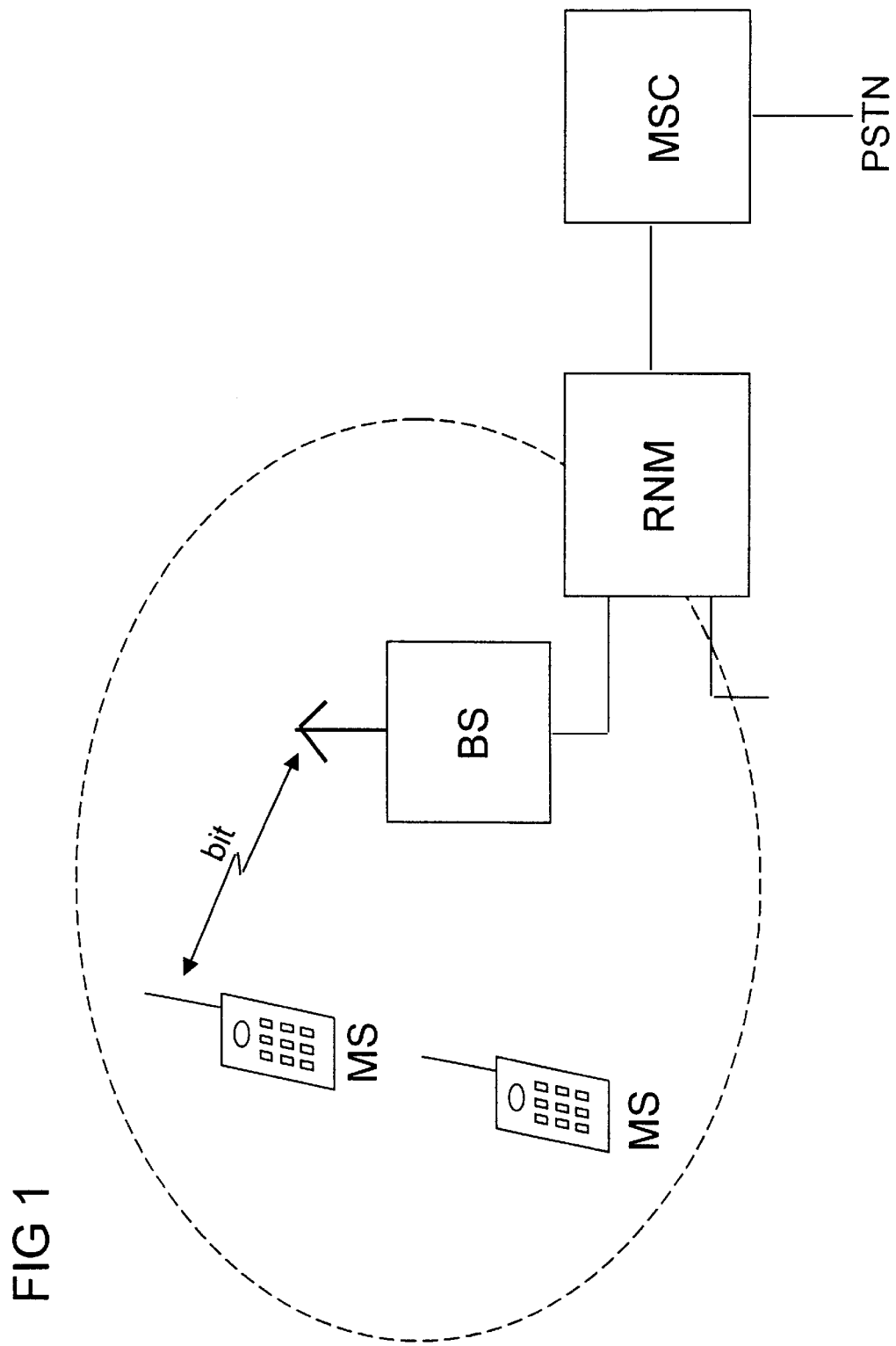
FIG. 1 is a block diagram of a radio communications system, in particular of a mobile radio system.

Referring now to the figures of the drawing in detail and first, particularly, to FIG. 1 thereof, there is seen structural view of a radio communications system which, by way of example, is configured as a mobile radio system corresponding to a conventional GSM mobile radio system or UMTS mobile radio system. The system comprises a large number of mobile switching centers MSC, which are networked to one another and produce the access to a fixed network PSTN. Furthermore, the mobile switching centers MSC are connected to in each case at least one device for assigning radio resources RNM. Each of the devices RNM in turn allows a connection to be made to at least one base station BS. The base station BS is a radio station, which can set up and clear communications links to mobile stations MS via a radio interface.

By way of example, FIG. 1 shows a communications link for transmitting symbols bit for example in a real-time service or a non-realtime service between a mobile station MS and a base station BS. Before each transmission via the radio interface, redundancy is added to the symbols at the transmitter end by means of channel encoding. The redundancy is removed at the receiver end, allowing the faulty symbols to be identified and corrected. A further mobile station MS, which has not set up any communications link in the illustrated case, is located in the radio supply area of the base station BS.

Two channel encoding types for the purpose of forward error correction are known from the GSM mobile radio system: convolution coding and block coding. Convolution coding is used to correct errors at the reception end, so that a specific number of faulty symbols bit can be identified and corrected in each case, depending on the convolution coding rate. The convolution coding rate indicates the ratio between the number of symbols before and after convolution coding. For example, a rate 1 means that no redundant information is added to the symbols bit at the transmitter end. In addition or as an alternative to convolution coding, block coding can be carried out, for example cyclic redundancy checking (CRC) for the symbols bit, in which case a block code consisting of parity checking symbols is calculated and is added to the sum of the symbols bit. This block code makes it possible to identify the fact that an error has occurred during the transmission via the radio interface, but error correction is not always possible. In non-realtime services, for example, the block code can be used to control a repeated request for a faulty data packet, in accordance with the known ARQ method. Alternatively, channel encoding can likewise be carried out by means of turbo encoding, which was mentioned in the introductory description above, or chaining of an outer and an inner encoding.

Figure 2:
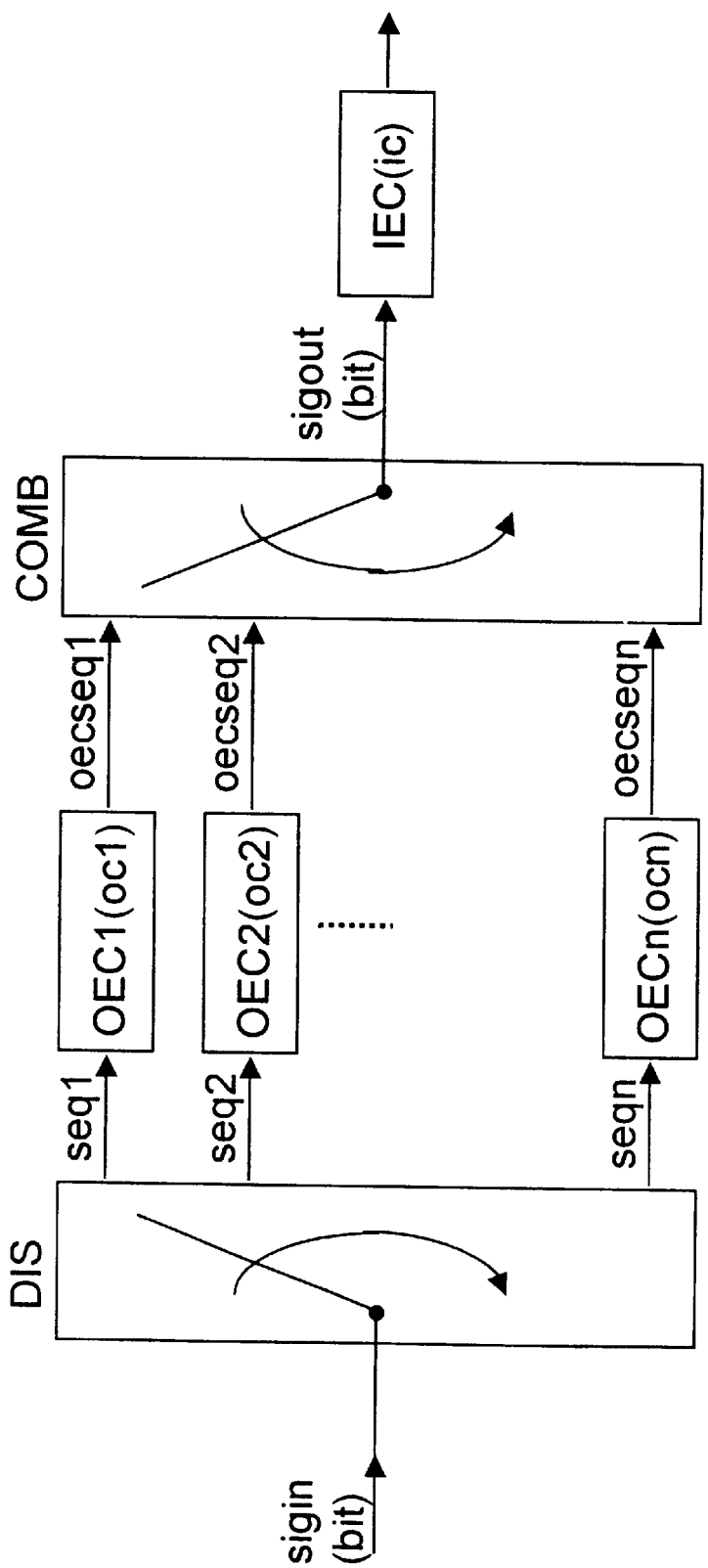
FIG. 2 is a schematic block diagram of a configuration according to the invention for error protection encoding.
Figure 3:
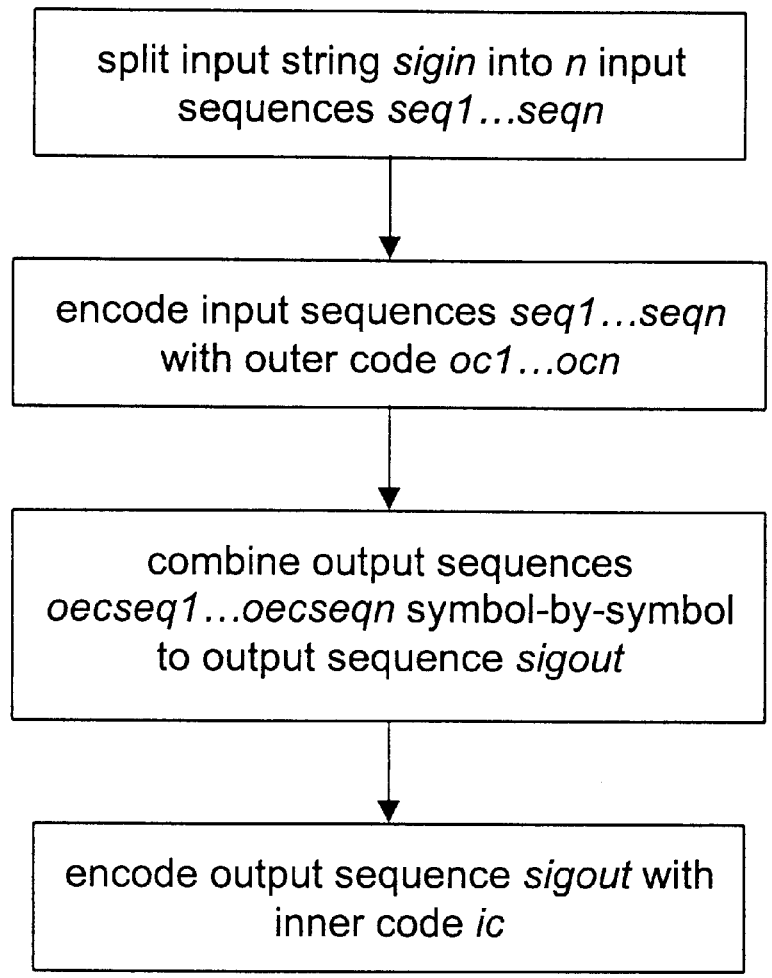
FIG. 3 is a flowchart of the method according to the invention.

FIG. 2 shows a block diagram of a configuration according to the invention for error protection encoding, and FIG. 3 shows a corresponding flowchart of the method for error protection encoding. A terminated input string sigin of symbols bit which is produced, for example, by a voice encoder at periodic time intervals, is intended to be provided with error protection encoding for transmission via the radio interface of the radio communications system.

According to the invention, error protection encoding is carried out by means of a serial chaining of a plurality of outer component codes and one inner component code to form an entire code. The input string sigin is split into a number n of input sequences seq1 . . . seqn, with timing control, by a splitting device DIS. The splitting can in this case be carried out symbol-by-symbol or alternatively word-by-word, that is to say into respective words with a plurality of symbols bit. The input sequences seq1 . . . seqn split in this way are respectively supplied to an outer encoding device OEC1 . . . OECn, in which the input sequences seq1 . . . seqn are provided with an outer encoding by means of individual outer codes oc1 . . . ocn.

Convolution coding is in each case assumed for the outer and inner encoding in the exemplary embodiments of the invention described in FIG. 2 to FIG. 8.

Convolutional codes with a rate of 1/2 and a memory of [1,6] have been identified for an optimum result with regard to a large minimum distance for the overall code. These convolutional codes are also called optimal free distance (OFD) codes. Further convolutional codes with higher rates can be achieved, for example, by means of additional puncturing of the OFD codes.

Since convolution coding of an input sequence produces an infinite output sequence, the convolutional codes must be terminated in order to produce output sequences of finite length. A distinction is drawn between three types of termination for this purpose:

truncation, with a high bit error probability close to the truncation point;

addition of a termination sequence, in order to set the coder to a defined final state, with the disadvantage that additional redundancy is required; and tail biting, the initial and final states of the coder are the same, but a disadvantage is that the level of decoding complexity is increased.

The rest of the description is based on OFD convolutional codes, as outer codes oc1 . . . ocn, using the same rate and the same memory, which are each terminated by a termination sequence, are coded systematically, and may be punctured. The inner code ic is assumed to be an OFD convolutional code which is terminated by a termination sequence and may be punctured. Systematic encoding serves mainly to simplify the decoding of the entire code, as is described with respect to the illustration in FIG. 7.

For the situation where there are a large number of outer codes oc1 . . . ocn, each of which is short, the loss (fractional rate loss) resulting from the additional redundancy owing to the termination is not negligible. In this case, tail biting is used to terminate the inner code ic and the outer codes oc1 . . . ocn.

In the outer encoding devices OEC1 . . . OECn, the input sequences seq1 . . . seqn are each convolution-coded with an outer code oc1 . . . ocn as in the above description. A combination device COMB which is connected downstream of the outer encoding devices OEC1 . . . OECn reads the output sequences oecseq1 . . . oecseqn, which are present at the respective outputs of the outer encoding devices OEC1 . . . OECn, symbol-by-symbol, so that the respective symbols bit in the resultant terminated output string sigout follow one another at the outputs of the outer encoding devices OEC1 . . . OECn.

Alternatively, the outer encoding can also be carried out, for example, in such a way that a single outer encoding device provides convolution coding for the input sequences seq1. . . seqn with the number n of different outer codes oc1 . . . ocn, and the output sequences oecseq1 . . . oecseqn obtained in this way are each entered line-by-line in a memory matrix, from which they are subsequently read once again column-by-column by the combination device COMB.

After the combination of the output sequences oecseq1 ... oecseqn symbol-by-symbol to form the terminated output string sigout, this string is convolution-coded in a downstream inner coder IEC with an inner code ic in accordance with the above description. The input string sigin of symbols bit is thus coded by the serial chaining of the outer component codes oc1 ... ocn and the inner component code ic, which together produce the entire code, and can then be supplied to a transmitting device, for example in a mobile station MS or base station BS, and can be transmitted via the radio interface.

As an alternative to the described implementation, it is possible according to a modification of the arrangement shown in FIG. 2, which is not illustrated, for the outer encoding of the input sequences seq1 ... seqn to be carried out in such a manner that a different termination sequence is in case added to the input sequences seq1 ... seqn, and the input sequences seq1 ... seqn expanded in this way are then coded by means of a common outer code. The different termination sequences change the outer encoding devices to a respective known state resulting in a capability to distinguish the resultant output sequences oecseq1 ... oecseqn which is comparable with the encoding described above using individual outer codes oc1 ... ocn.

Alternatively, this implementation can also be carried out in such a way that a single outer encoding device has connected upstream of it a number of termination devices, corresponding to the number of input sequences, for addition of the respective termination sequences, or in such a way that only one termination device is used which in each case adds an individual termination sequence to the input sequences which arrive in serial form, in which case the encoding devices do not themselves terminate the input sequences.

Figure 4:
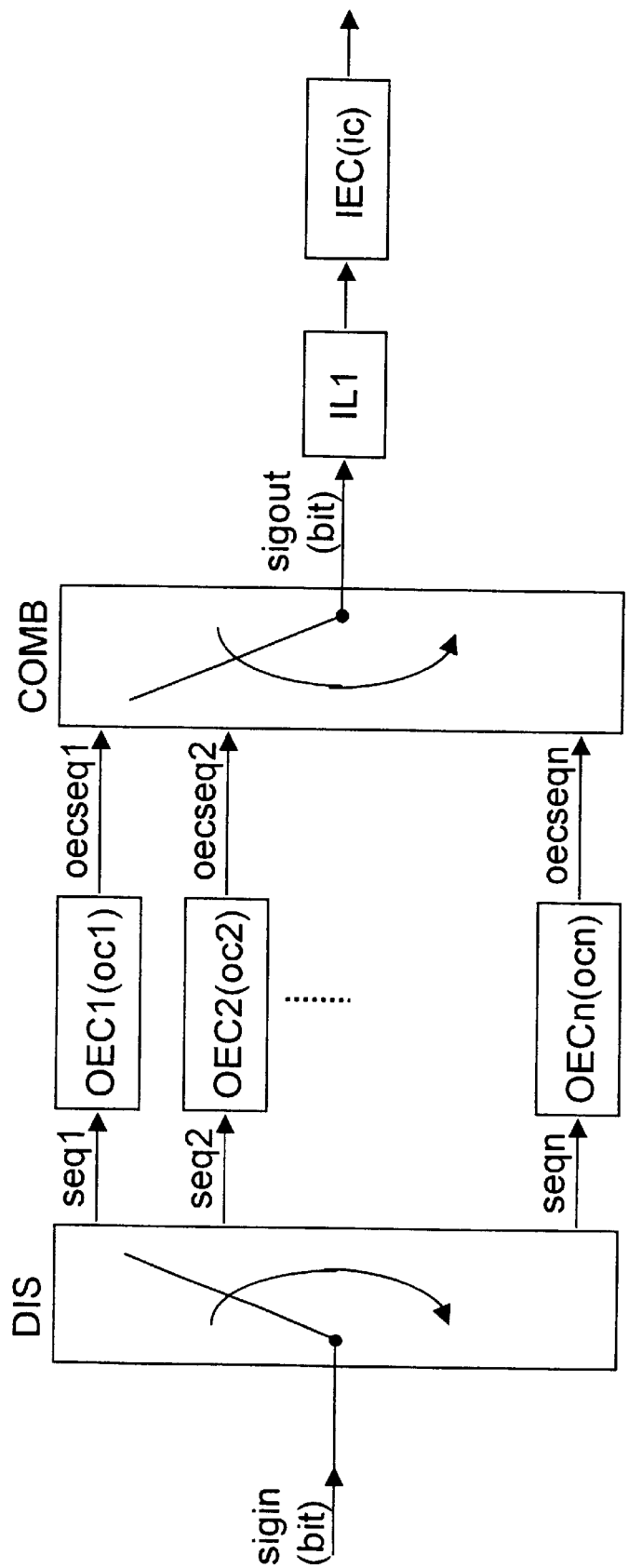
FIG. 4 is a schematic block diagram of the configuration shown in FIG. 2, with an additional interleaving device connected downstream of the combination device in the signal flow direction.
Figure 5:
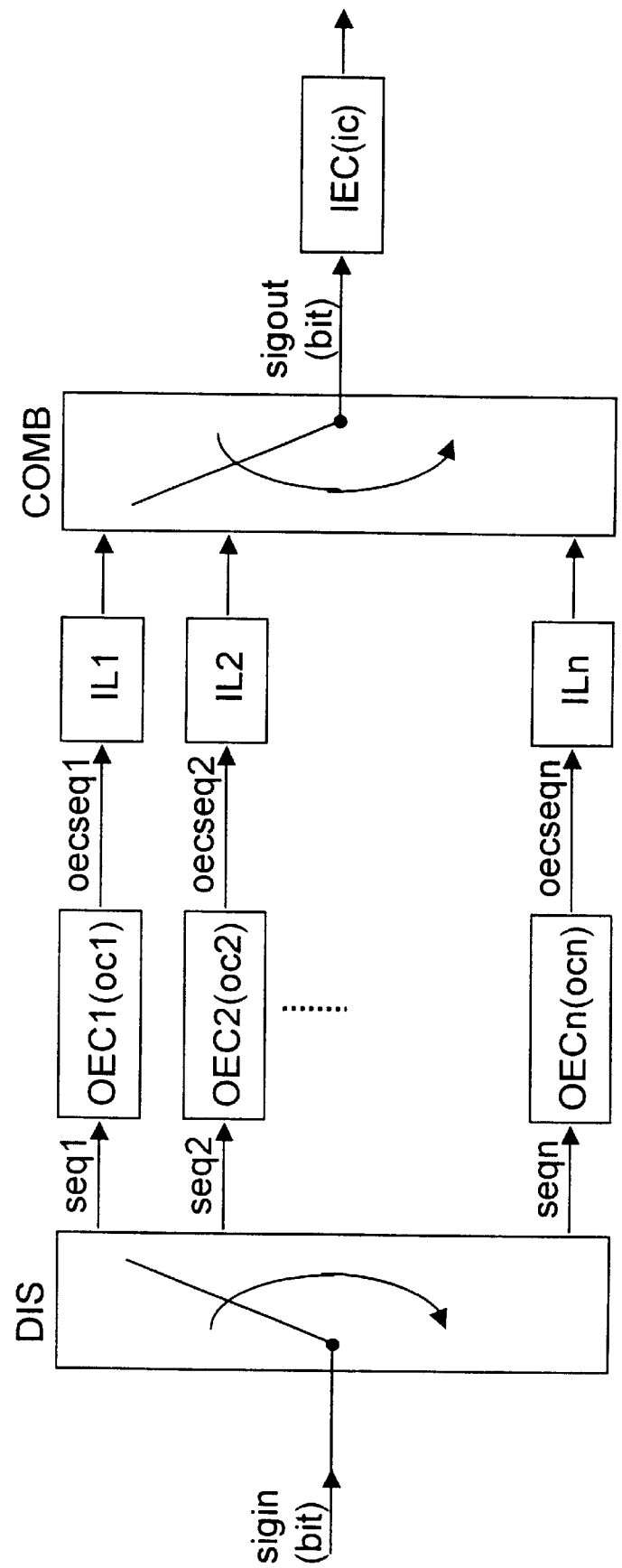
FIG. 5 is a schematic block diagram of the configuration shown in FIG. 2, with a plurality of additional interleaving devices each connected downstream of the outer encoding devices.
Figure 6:
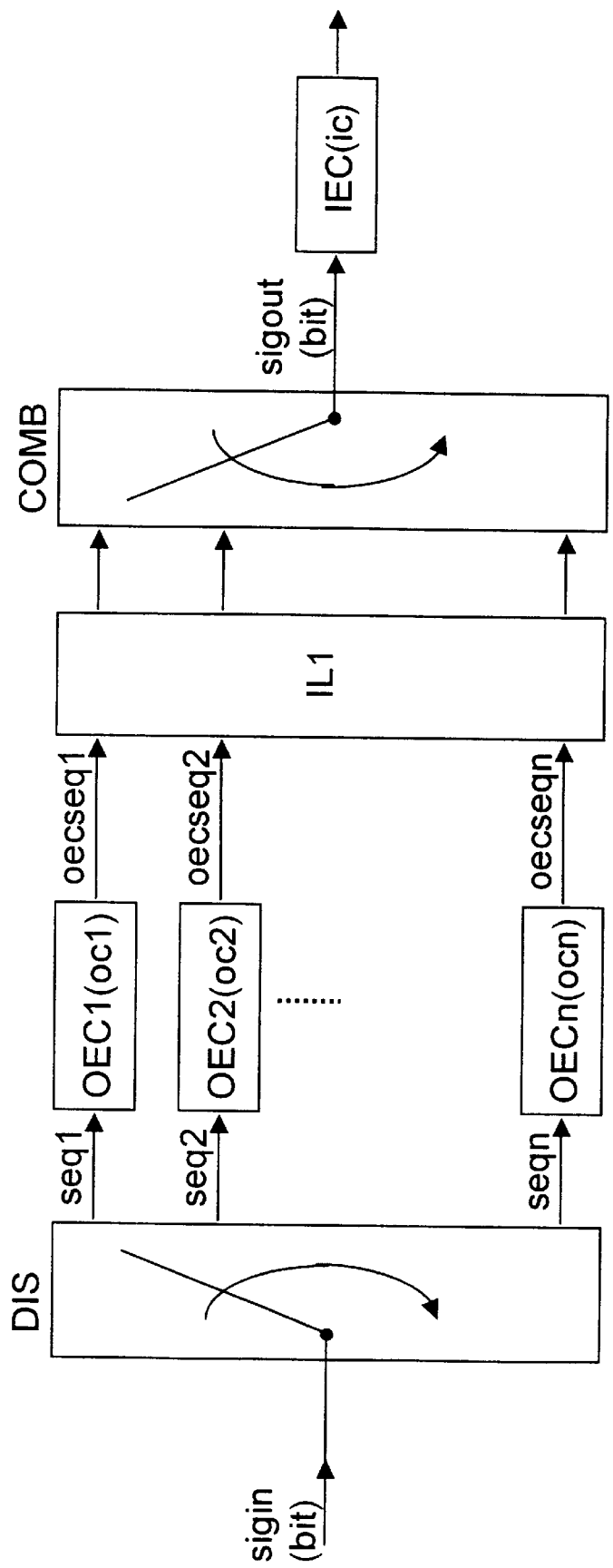
FIG. 6 is a schematic block diagram of the configuration shown in FIG. 2, with an additional interleaving device connected downstream of the outer encoding devices.

The performance of the overall code can be improved further by additional interleaving between the outer and the inner encoding. Three alternative embodiments of that process are illustrated in FIG. 4 to FIG. 6. Interleaving scrambles directly successive symbols bit so that, in general, they then no longer follow one another. The interleaving of the symbols bit improves the interference immunity with respect to groups of faulty symbols bit, which frequently occur, during transmission via the radio interface.

According to a first alternative embodiment in FIG. 4, an interleaving device IL1 is connected downstream of the combination device COMB. This interleaving device IL1 scrambles, for example, a number of symbols bit corresponding to the number of outer encoding devices OEC1 ... OECn. The number of symbols bit to be scrambled may, however, be specified independently of the number of encoding devices OEC1 ... OECn, for example to be greater or less than this number; it depends essentially on the respective memory capacity of the interleaving device IL1 and of the required symbol throughput rate.

According to a second exemplary alternative embodiment shown in FIG. 5, an interleaving device IL1 ... ILn is connected downstream of each of the outer encoding devices OEC1 ... OECn. The respective output sequences oecseq1 ... oecseqn are scrambled by an individual interleaving algorithm in the interleaving devices IL1 ... ILn. In general, the interleaving process and the subsequent symbol-by-symbol combination result in two combined symbols bit being separated from one another after the outer encoding, as a result of which the probability of interference acting on both symbols bit is advantageously reduced.

A third exemplary alternative embodiment of the interleaving process is shown in FIG. 6. The symbols bit in the output sequences oecseq1 ... oecseqn are scrambled with respect to one another in an interleaving device IL1 which is connected downstream of the outer encoding devices OEC1 ... OECn, so that not only the position within the output sequence oecseq1 ... oecseqn but also the output sequence oecseq1 ... oecseqn of the symbol bit is itself interchanged.

Figure 7:
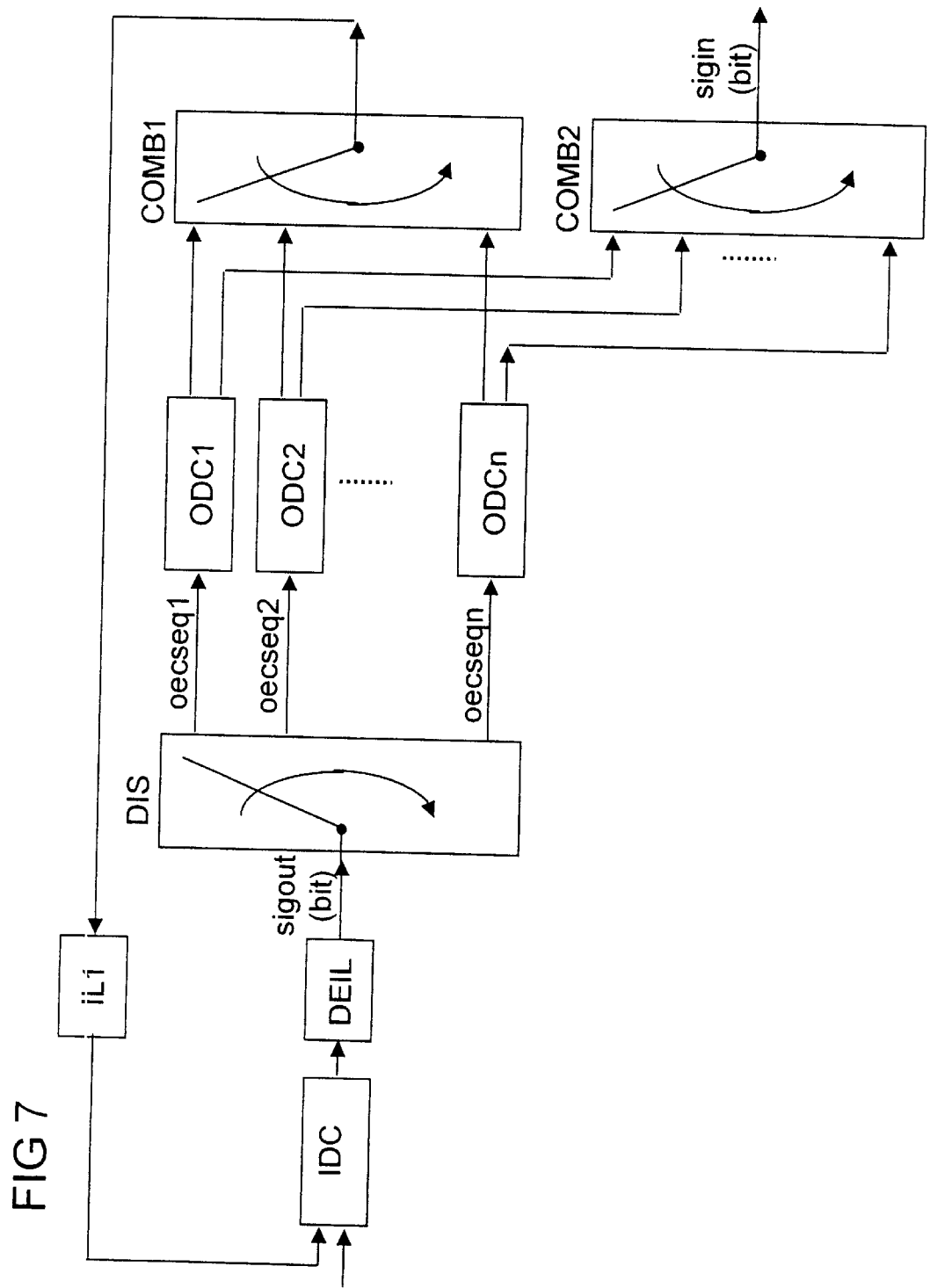
FIG. 7 is a schematic block diagram of a configuration for decoding the input string of symbols encoded by the configuration of FIG. 2.

FIG. 7 shows an example of an arrangement for iterative decoding of an input string sigin which is coded by means of the arrangement according to the invention in FIG. 4 and may be, for example, in the form of a receiving device in a mobile station MS or a base station BS of a mobile radio system. The input string sigin, which is coded using an outer and an inner component code and is additionally scrambled, has the inner encoding removed in an inner decoder device IDC. The original output string sigout of the symbols bit is then reproduced in a deinterleaving device DEIL, and the original output sequences oecseq1 ... oecseqn, which are then recovered by means of symbol-by-symbol splitting in a splitting device DIS, are in each supplied to an outer decoder device ODC1 ... ODCn. The respective outer information of the outer decoder devices ODC1 ... ODCn is combined symbol-by-symbol in a subsequent first combination device COMB, is interleaved via an interleaving device IL1 which operates in a corresponding manner to the interleaving device IL1 in FIG. 4, and is fed back to a second input of the inner decoder device IDC. The recovered, original input string sigin appears at the output of the second combination device COMB2.

Decoders corresponding to the encoding configurations shown in FIG. 2, FIG. 5 and FIG. 6 can be produced in accordance with the structure in FIG. 7.

So-called soft-input, soft-output (SISO) decoders are used to decode the symbols bit coded by means of component codes. These decoders may be, for example, symbol-by-symbol APP decoders (aposteriori probability), or other suboptimal SISO decoders. Since efficient symbol-by-symbol APP decoders for convolution-coded symbols bit are known from the prior art, for example according to Bahl, Cocke, Jelinek, and Raviv, "Optimal Decoding For Linear Codes For Minimizing Symbol Error Rate", IEEE Trans. Inform. Theory, Vol. IT-20, pages 284–87, March 1974, convolutional codes are preferably used as component codes. The symbol-by-symbol APP decoder gives the best performance for a systematically coded component code.

Figure 8:
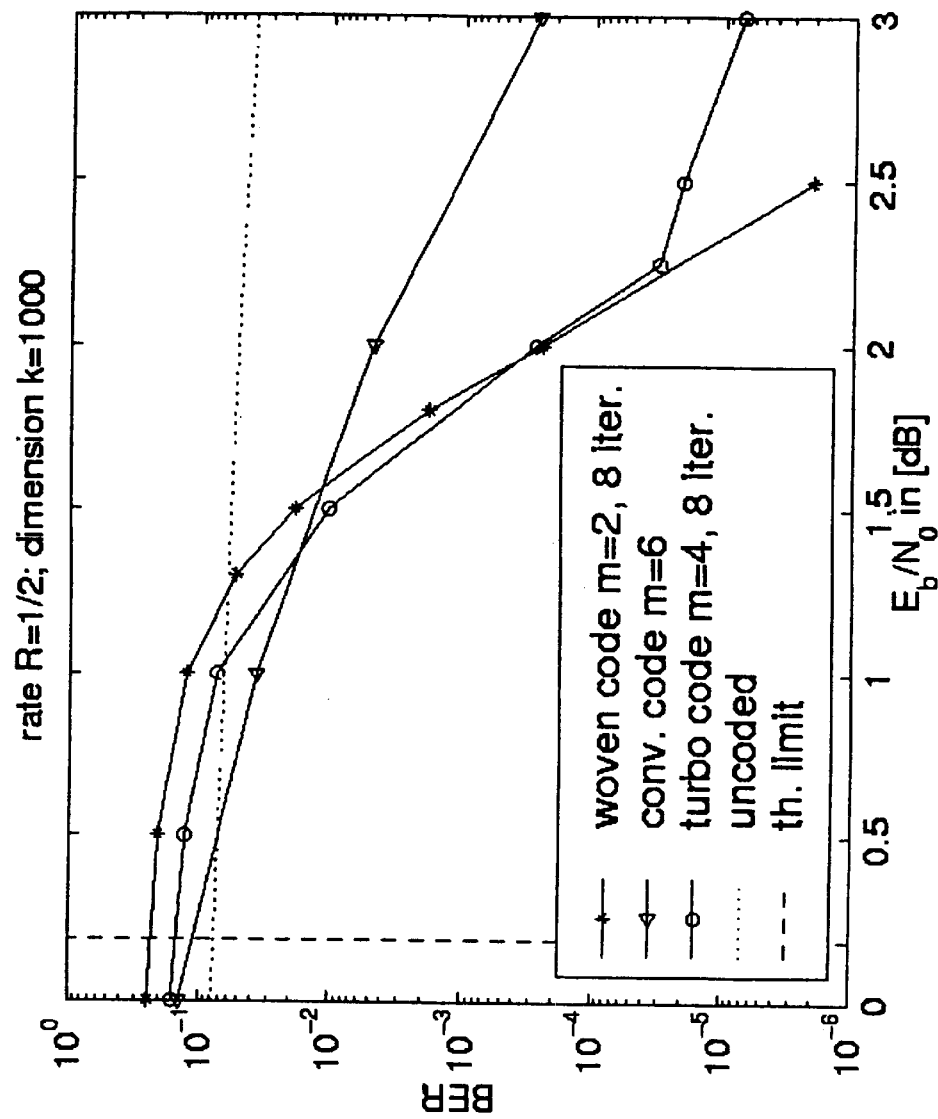
FIG. 8 is a chart of the relationships between a bit error rate and a signal-to-noise ratio for different types of encoding.

By way of example, FIG. 8 shows an illustration of a determined respective relationship between a bit error rate BER and a signal-to-noise ratio $E_b/N_0$ (Energy-per-bit-to-Noise ratio) in dB for different types of encoding. Convolutional coding with a rate of R=1/2 is in each case assumed here. A relationship determined by means of encoding according to the invention as shown in the arrangement in FIG. 5 is identified by the term "woven code" in FIG. 8. In this case, the memory m is m=2, and the decoding is carried out iteratively in a decoding device based on FIG. 7. Relationships for simple convolution coding, which is identified by "conv. code", with a memory m=6, and turbo encoding, which is identified by "turbo code", with a memory m=4 are in each case compared with this result. A comparison of the relationships clearly shows that the encoding according to the invention requires only a signal-to-noise ratio $E_b/N_0$ of approximately 2.5 dB to achieve a bit error rate of $10^{-6}$, while turbo encoding requires a considerably greater signal-to-noise ratio $E_b/N_0$ even for lower bit error rates. A low bit error rate with a low signal-to-noise ratio $E_b/N_0$ is particularly important for data transmission, for example in future mobile radio systems such as UMTS, since the aim is to ensure a low bit error rate BER and good transmission quality even in poor transmission and reception conditions.

We claim:

1. A method of encoding symbols for transmission via a radio interface of a radio communications system, which comprises:

splitting, with timing control, a terminated input string with symbols into at least two input sequences;

individually encoding the input sequences with an outer code and forming output sequences;

combining the output sequences symbol-by-symbol into an output string with symbols and individually interleaving the symbols within each of the respective output sequences; and encoding the output string with an inner code.

2. The method according to claim 1, which comprises encoding the input sequences with an outer code that is different for each input sequence.

3. The method according to claim 1, wherein the outer encoding comprises one of convolution coding and block coding.

4. The method according to claim 1, wherein the inner encoding comprises one of convolution coding, block coding, and modulation.

5. The method according to claim 1, wherein the splitting step comprises splitting the input string symbol-by-symbol into a number of input sequences.

6. The method according to claim 1, which comprises encoding with the inner code each of a number of symbols in the output string corresponding to a number of input sequences.

7. The method according to claim 1, which further comprises interleaving the respective output sequences in accordance with individual interleaving algorithms.

8. The method according to claim 1, which further comprises additionally interleaving the symbols in the output sequences.

9. A method of encoding symbols for transmission via a radio interface of a radio communications system, which comprises:

splitting, with timing control, a terminated input string with symbols into at least two input sequences;

individually encoding the input sequences with an outer code and forming output sequences;

combining the output sequences symbol-by-symbol into an output string with symbols;

interleaving a number of symbols in the output string; and encoding the output string with an inner code.

10. The method according to claim 1, which comprises interleaving in each case a number of symbols in the output string corresponding to a number of input sequences.

11. The method according to claim 1, which comprises transmitting the symbols via a radio interface of a mobile radio system.

12. The method according to claim 1, which comprises transmitting the symbols via a radio interface of a wireless subscriber access system.

13. A configuration for encoding symbols for transmission via a radio interface of a radio communications system, comprising:

a splitting device with timing control for splitting a terminated input string with symbols into at least two input sequences;

a plurality of outer encoding devices connected downstream of said splitting device in a direction of signal flow, said outer encoding devices individually encoding the input sequences to form output sequences with an outer code;

a combination device connected downstream of said outer encoding devices in the signal flow direction, said combination device combining the output sequences symbol-by-symbol to form a terminated output string with symbols;

at least one interleaving device for individually interleaving the symbols within each of the respective output sequences, said at least one interleaving device connected downstream of a respective one of said outer encoding devices; and an inner encoding device connected downstream of said combination device in the signal flow direction, said inner encoding device encoding the output string with an inner code.

14. The configuration according to claim 13, which further comprises at least one interleaving device for interleaving the symbols in the output sequences connected downstream of said outer encoding devices.

15. The configuration according to claim 13 in combination with a transmitting device of a mobile station of a mobile radio system.

16. The configuration according to claim 13 in combination with a base station of a mobile radio system.

17. A configuration for encoding symbols for transmission via a radio interface of a radio communications system, comprising:

a splitting device with timing control for splitting a terminated input string with symbols into at least two input sequences;

a plurality of outer encoding devices connected downstream of said splitting device in a direction of signal flow, said outer encoding devices individually encoding the input sequences to form output sequences with an outer code;

a combination device connected downstream of said outer encoding devices in the signal flow direction, said combination device combining the output sequences symbol-by-symbol to form a terminated output string with symbols;

at least one interleaving device connected downstream of said combination device for respectively interleaving a number of symbols in the output string; and an inner encoding device connected downstream of said combination device in the signal flow direction, said inner encoding device encoding the output string with an inner code.

* * * * *